(12) United States Patent
Farber et al.

(10) Patent No.: US 7,933,258 B2
(45) Date of Patent: Apr. 26, 2011

(54) BYPASSING TRANSCODING OPERATIONS IN A COMMUNICATION NETWORK

(75) Inventors: Nikolaus Farber, Erlangen (DE); Karl Hellwig, Wonfurt (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1597 days.

(21) Appl. No.: 10/512,103

(22) PCT Filed: Apr. 24, 2003

(86) PCT No.: PCT/EP03/04268
§ 371 (c)(1),
(2), (4) Date: May 24, 2005

(87) PCT Pub. No.: WO03/092312
PCT Pub. Date: Nov. 6, 2003

(65) Prior Publication Data
US 2005/0232232 A1   Oct. 20, 2005

(30) Foreign Application Priority Data

Apr. 24, 2002   (EP) .................................... 02009133

(51) Int. Cl.
H04L 12/66   (2006.01)
(52) U.S. Cl. ....................................... 370/352; 370/357
(58) Field of Classification Search ................... 370/352, 370/357; 700/94
See application file for complete search history.

(56) References Cited

U.S. PATENT DOCUMENTS

| 6,172,974 B1 * | 1/2001 | Tseng et al. .................. 370/357 |
| 6,324,409 B1 * | 11/2001 | Shaffer et al. .............. 455/552.1 |
| 6,421,733 B1 * | 7/2002 | Tso et al. ...................... 709/246 |
| 2001/0006895 A1 | 7/2001 | Della Mea |

(Continued)

FOREIGN PATENT DOCUMENTS

GB   2352127 A   1/2001

OTHER PUBLICATIONS

ETSI: "Digital Cellular Telecommunication System (phase 2+) (GSM); Universal Mobile Telecommunications System (UMTS); Inband Tandem Free Operation (TFO) of Speech Codecs; Service Description; Stage 3 (3GPP TS 28.062 version 5.0.0 Release5)", ETSI TS 128 062 V5.0.0 'Online! Mar. 2002, XP002248624 Retrieved from Internet: <URL:http://www.etsi.org>.

(Continued)

*Primary Examiner* — Vivian Chin
*Assistant Examiner* — Friedrich Fahnert
(74) *Attorney, Agent, or Firm* — Roger S. Burleigh

(57) ABSTRACT

A method and a device for initiating the bypassing of a pair of transcoding operations that are performed in series by a first transcoder arranged together with a first communication terminal on a local side of a communication network and by a second transcoder arranged together with a second communication terminal on a distant side of the communication network are described. The method includes receiving from the distant side information about an encoding format currently in use on the distant side and about encoding capabilities of the distant side and transmitting to the distant side information about an encoding format currently in use on the local side and about encoding capabilities of the local side to enable on one or on both sides a change of the encoding format currently in use prior to initiating the bypassing of the transcoding operations.

23 Claims, 8 Drawing Sheets

U.S. PATENT DOCUMENTS

2001/0024960 A1  9/2001  Mauger

OTHER PUBLICATIONS

European Patent Office, International Search Report for PCT/EP03/04268, dated Jul. 22, 2003.

Chung-Cheung Chu: "TFO Version Message Proposal", 3GPP TSG-A.C.1 Tandem Free Operation, Feb. 7, 2001 Teleconference, Nortel Networks, 2351 Boul. Alfred Nobel, St. Laurent, Quebec, Canada.

3GPP: 3GPP TSG-S4 TFO s4-020111, Change Request TS 28.062 CR011 v4.2.0, Feb. 18-22, 2002, Lulea, Sweden.

International Telecommunication Union: ITU-T Recommendation G.711, General Aspects of Digital Transmission Systems, Pulse Code Modulation of Voice Frequencies, Nov. 1988.

3GPP: 3GPP TS 23.153 v4.4.0, $3^{rd}$ Generation Partnership Project; Technical Specification Group Core Network; Out of Band Transcoder Control—Stage 2; Release 4; Dec. 2001; 650 Route des Lucioles, Sophia Antipolis, Valbonne, France.

3GPP: 3GPP TS 48.060 v4.1.0, $3^{rd}$ Generation Partnership Project; Technical Specification Group GSM/EDGE Radio Access Network; In-band control of remote transcoders and rate adaptors for full rate traffic channels (Release 4); Feb. 2002; 650 Route des Lucioles, Sophia Antipolis, Valbonne, France.

3GPP: 3GPP TS 48.061 v4.1.1, $3^{rd}$ Generation Partnership Project; Technical Specification Group GSM/EDGE Radio Access Network; In-band control of remote transcoders and rate adaptors for full rate traffic channels (Release 4); Feb. 2002; 650 Route des Lucioles, Sophia Antipolis, Valbonne, France.

* cited by examiner

| Bit | Description | Comment |
|---|---|---|
| Bit 1 | "0" | normal IS-Message Sync Bit, constant. |
| Bit 2..6 | Selector | Indicates if and which further extension_blocks are following. Coding for bits 2.3.4.5.6: 00000: nothing is following after this TFO_Version 00001: One (or more) alternative Codec Type(s) is (are) following, 10101: reserved (used by the IS_Header) all other codes: reserved for future use. |
| Bit 7..10 | Ver | This field contains the TFO_Version number |
| Bit 11 | "0" | normal IS-Message Sync Bit, constant |
| Bit 12..15: | Sver | This field contains the TFO_Subversion number |
| Bit 16..18: | CRC | 3 CRC bits protecting Bits 2 to 10 and 12 to 15 |
| Bit 19..20: | EX | The normal 2 bits for IS_Message Extension: 00: No other extension block follows 11: An other extension block follows |

Fig. 6a

| Bit | Description | Comment |
|---|---|---|
| Bit 1 | "0" | normal IS-Message Sync Bit, constant. |
| Bit 2 | PAR_Sel | Differentiates this Extension_Block 0: Parameters included in PAR field: Simple Codec_List_Extension 1: Length Indicator (LI) included: Parameters follow in subsequent Extension_Blocks |
| Bit 3..10 | CoID | This field identifies the Codec_Type for which the subsequent attributes are valid. The same coding as in the Codec_x Extension_Block is used (long form) |
| Bit 11 | "0" | normal IS-Message Sync Bit, constant |
| Bit 12..15: | LI / PAR | If Par_Sel==1: LI: Length Indicator: 0000: reserved; 0001: one other Extension_Block follows, etc. If Par_Sel==0: PAR: Codec specific definition of these four bits |
| Bit 16..18: | CRC | 3 CRC bits protecting Bits 2 to 10 and 12 to 15 |
| Bit 19..20: | EX | The normal 2 bits for IS_Message Extension: 00: No other extension block follows 11: An other extension block follows |

Fig. 6b

| Feature→<br>Codec Type↓ | TFO Version | Immediate Codec Type Optimisation | Generic Configuration Frames |
|---|---|---|---|
| GSM_FR<br>GSM_HR<br>GSM_EFR | Optional.<br>The TFO Version extension block need not to be sent.<br>If not contained in TFO Messages, or is lower than 5.3,<br>then Pre-REL-5 handling shall apply | Mandatory, if TFO Version is 5.3 or higher. | If the TFO Version is lower than 5.3 then Generic Configuration Frames shall not be used. Only TFO_REQ_L and (TFO_ACK_L) shall be used.<br><br>If the TFO Version is 5.3 or higher, then Generic Configuration Frames shall be used. TFO_REQ_L and TFO_ACK_L shall not be used embedded into TFO Frames. |
| FR_AMR<br>HR_AMR<br>UMTS_AMR<br>UMTS_AMR2<br>OHR_AMR | Optional.<br>The TFO Version extension block need not to be sent.<br>If not contained in TFO Messages, or is lower than 5.3,<br>then Pre-REL-5 handling shall apply | Mandatory, if TFO Version is 5.3 or higher. | If the TFO Version is lower than 5.3, then Generic ConfigurationFrames shall not be used. If the TFO Version is 5.3 or higher, then Generic Configuration Frames shall be used. The parameter field in REL-4 AMR Configuration frames shall be treated as undefined. TFO_REQ_L and TFO_ACK_L shall not be used embedded into TFO Frames. |
| FR_AMR-WB<br>UMTS_AMR-WB<br>OFR_AMR-WB<br>OHR_AMR-WB | Mandatory.<br>The TFO Version extension block shall always be sent. | Mandatory. | Generic Configuration Frames shall be used. TFO_REQ_L and TFO_ACK_L shall not be used embedded into TFO Frames. |

Fig. 10

BYPASSING TRANSCODING OPERATIONS IN A COMMUNICATION NETWORK

FIELD OF THE INVENTION

The present invention relates to the call set-up in a communication network. More specifically, the invention relates to the bypassing of a pair of transcoding operations that are performed in series by a first transcoder arranged on a local side of the communication network and by a second transcoder located on a distant side thereof.

BACKGROUND OF THE INVENTION

In digital systems for mobile communication speech signals are encoded by a speech encoder in order to reduce the data rate and for saving bandwidth. In a call originating in a mobile terminal and terminating in a mobile terminal, a so-called mobile-to-mobile call, the speech signal usually is encoded and decoded twice. In the originating mobile terminal the speech signal is encoded a first time before the encoded signal is sent over the air to a first network node, e.g. a base station. A first transcoder decodes the encoded signal, which it receives from the first network node, into a so-called a-law/μ-law signal which is commonly used in fixed communication networks. The decoded signal is routed in the fixed network to a second network node, e.g. a second base station. Before the second network node can transmit the signal, the signal is encoded again in a second transcoder. The encoded signal is emitted by the second network node and is decoded in the terminating mobile terminal. The speech signal flow in the opposite direction is handled symmetrically.

As in this configuration two encoder/decoder pairs are lined up (the encoder of the originating mobile terminal and the decoder of the originating transcoder are regarded as a first pair and the encoder of the terminating transcoder and the decoder of the terminating mobile terminal are regarded as a second pair), this configuration is called a speech codec "tandem". The key inconvenience of a tandem configuration is the speech quality degradation introduced by the double transcoding. This degradation is usually more noticeable when the speech codecs are operating at low transmission rates.

When the originating and the terminating mobile terminal are using the same type of speech codec, it is possible to transmit the speech frames received from the originating mobile terminal to the terminating mobile terminal without the need to activate the transcoding functions in the first and the second transcoder. As then there is only one pair of encoder and decoder (that is, the encoder in the originating mobile terminal and the decoder in the terminating mobile terminal) involved, this configuration is called Tandem Free Operation (TFO). In modern networks, like UTMS, it is even possible to discard the whole transcoder hardware. This is then called a Transcoder Free Operation (TrFO) instead of e.g. the usual a-law/μ-law signal. In TFO and TrFO mode the encoded and compressed speech signal is transmitted over the fixed network. Besides the improvement of the speech quality by avoiding double transcoding TFO also saves costs as the compressed signal needs less bandwidth in the fixed network and power is saved since transcoding is bypassed twice. All necessary methods for negotiating, establishing and maintaining a Tandem Free Operating connection (TFO connection) are standardized for codec types without configuration parameters (e.g. in GSM 08.62 for GSM_FR, GSM_HR and GSM_EFR) or for more complex codec types (e.g. the adaptive multi-code rate (AMR)) by the $3^{rd}$ Generation Partnership Project (3GPP).

In Technical Specification 3G TS 28.062 V.5.0.0; $3^{rd}$ Generation Partnership project; Technical Specification Group Services & Systems Aspects; In-band Tandem Free Operation (TFO) of Speech Codecs; Stage 3; Service Description; Release 5, which is exemplary in respect of bypassing serial transcoding operations, various aspects of TFO for 3GPP are illustrated. TFO is activated and controlled in 3GPP by so-called Transcoder Units after the completion of the call set-up phase at both ends of a mobile-to-mobile call configuration. The TFO protocol is fully handled and terminated in the Transcoder Units. For this reason, the Transcoder Units cannot be bypassed in TFO. This is the key difference in comparison with TrFO which is defined in 3GPP TS 23.153. In return, the Transcoder Units continuously monitor the normal TFO and can terminate TFO as soon as necessary with limited impact on the speech quality.

Before TFO is activated, the Transcoder Units exchange conventional 64 kbit/s PCM speech samples encoded according to a-law or μ-law. The Transcoder Units can also exchange TFO messages by stealing the least significant bit in every 16th speech sample (see annex A of 3GPP TS 28.062 V5.0.0 for the specification of the TFO message transmission rules and clauses 6 to 8 for the description of the TFO procedures and message contents).

If compatible speech codec types and configurations are used at both ends of the mobile-to-mobile call configuration, the Transcoder Units automatically activate TFO. If incompatible speech codec types and/or configurations are used at both ends, then a codec mismatch situation exists. TFO cannot be activated until the codec mismatch is resolved. This capability is an optional feature involving other network elements of the Radio Access Network (RAN).

Once TFO is activated, the Transcoder Units exchange TFO frames carrying compressed speech and in-band signaling, the structure of which is derived from the GSM TRAU frames defined in the 3GPP TS 48.060 and 48.061 (see clause 5). The is exchange of TFO messages is still possible while TFO is active. In this case, the stealing process will result in embedding a message in the synchronization pattern of the TFO Frame.

If the Transcoder Units find that the codec types currently used by both mobile terminals are compatible they will immediately enter into a TFO mode. Although the mobile terminals often support a codec type with better properties (e.g. better speech quality or better data rate) than the currently used codec type, very often they will not start with the optimal codec type because only the codec type currently in use is signaled. If on the other hand both radio subsystems would always report the best codec type supported by the respective mobile terminal no agreement will be found and the communication will be started in tandem mode, although a TFO mode would have been possible.

Although certain procedures ensure that in the course of the communication the communication connection can be switched to a common codec type and thus TFO can be enabled later on, the establishment is significantly delayed and the signal distortions in an initial tandem operation mode are inconvenient. Therefore, one could think about reporting a codec type with lower properties but that is widely spread in order to establish TFO very early. As further on messages are exchanged that report a list of supported codec types of each terminal, in the course of the connection the codec type in use may be changed to a better codec type. However the users of the mobile terminals will experience the change of the codec while the TFO is established as (clicking) noise and may be irritated.

It is an object of the invention to improve the bypassing of two or more transcoding operations that are performed in series. It is a further object of the invention to allow an efficient protocol version handling.

SUMMARY OF THE INVENTION

According to a first aspect, the invention proposes a method of initiating the bypassing of a pair of transcoding operations performed in series by a first transcoder arranged together with a first communication terminal on a local side of a communication network and by a second transcoder arranged together with a second communication terminal on a distant side of the communication network. The method comprises receiving from the distant side information about an encoding format currently in use on the distant side and about encoding capabilities of the distant side, and transmitting to the distant side information about an encoding format currently in use on the local side and about encoding capabilities of the local side to enable on one or on both sides a change of the encoding format currently in use prior to initiating the bypassing of the transcoding operations.

Thus a change of the encoding format may be performed on the basis of an evaluation of local and distant encoding information, like the encoding format currently in use and the encoding capabilities, before the transcoding operations are bypassed. This allows enter an operational mode bypassing the transcoding operations using an encoding format that is beneficial from the point of view of system operators and users. The encoding information may be included in an initial message requesting bypassing of the transcoding operations.

A decision about the change of the encoding format may be performed even if compatible encoding formats are currently used on both sides. Thus, in the case of compatible encoding formats the transcoding operations may not be automatically bypassed but it may be decided if the current encoding formats, although being compatible, actually constitute the best configuration available.

The information on the encoding capabilities of the distant side may be used to determine an alternative encoding format that is supported on both the local and the distant side. The change of the encoding format may then effected on the basis of the alternative encoding format, e.g. by switching to this alternative encoding format.

The information about the encoding capabilities of the local side or distant side may include the version of a bypassing protocol, such as a TFO protocol version, supported by the local or distant transcoder. This allows for example to detect possible protocol conflicts at a very early stage and to decide if and how the conflicts can be resolved prior to bypassing the transcoding operations. In addition or as an alternative to a version of a bypassing protocol, the information about the encoding capabilities of the local or distant side may include a list of encoding formats supported by the local or distant communication terminal or transcoder. For example the list of encoding formats may specify preferred encoding formats or alternative encoding formats to the encoding format currently in use on a particular side of the communication network.

As has been mentioned above, the local and distant encoding information, including the encoding format currently in use and the encoding capabilities, may form the basis for a decision regarding a possible change of the encoding format currently in use. A change of the encoding format may be effected with the purpose of establishing an optimal encoding configuration on the basis of compatible encoding formats on both sides. If for example one side or both sides currently use narrowband encoding formats but both sides support wideband encoding formats, it may be decided on one side or on both sides to switch to the usually more preferable wideband encoding format prior to entering an operational state that bypasses the transcoding operations.

If one side changes its encoding format it may notify the opposite side thereof. Such a notification may be performed prior to entering an operational mode that bypasses the transcoding operations.

The bypassing protocol that is used for initiating the bypassing of the transcoding operations may include different states. For example the bypassing protocol may include a contact state which may be entered as soon as it is clear that compatible encoding formats exist and which may precede the bypassing of the transcoding operations. The bypassing protocol may further include an operational state in which the transcoding operations are bypassed.

Based on the local and distant encoding information available on one of the two sides it may be decided to change the encoding format on one or and both sides. This decision may be performed prior to switching into the contact state or in the contact state. The actual change of the encoding formats may be performed in the contact state. A switch from the contact state into the operational state may be performed after one or both sides have signaled that the encoding format currently in use will be or has been changed. In the case the of incompatible protocol versions it may be decided to abort the bypassing protocol, and to remain in tandem operation, prior to entering the contact state or in the contact state, i.e. at a rather early stage of the call.

The information about the encoding format may relate to various aspects depending on the specific communication scenario. It may for example include a codec type that is used on a specific side to encode speech signals into an encoded data representation. However, the invention is not restricted to the transcoding of speech signals but may be applied to handle the transcoding of encoded signals regardless of their particular content.

The information on the encoding capabilities of one side may be used on the other side to look up a subset of a list of encoding formats that is supported on the distant side. The list of supported encoding format may for example include a supported codec list (SCL). The subset or encoding formats supported on the distant side may then be compared with the encoding formats supported on the local side. On the basis of this comparison a change of the encoding format may be effected to initiate bypassing of the transcoding operations using the best encoding format in common.

The local and distant encoding information including the information about the encoding format currently in use and about encoding capabilities may be signaled between the local side and the distant side in various ways. For example the encoding information may be included in dedicated messages. As another example, the encoding information may be included in a message requesting the initiation of a bypassing protocol or in a message acknowledging such a request.

In the case the encoding information is included in messages that are used for additional signaling purposes, the information about encoding capabilities may be appended in the form of one or more individual information blocks to the message. For example a first appended block may include the version of a bypassing protocol and an indicator that indicates if the first appended block is followed by one or more further appended blocks that may include a list of one or more encoding formats supported by the respective side.

As has already been mentioned, the method set forth above can be performed in context with setting up of a TFO between two communication terminals. The invention may also be practiced in similar scenarios that involve a series of two or more transcoding operations.

If at least one of the communication terminals uses at least one codec type to encode speech signals into an encoded representation, messages may be sent between the two transcoders to determine if the communication terminals have at least one codec type in common. Should this be the case a data connection may be established between the two communication terminals without having the need to insert transcoding functions into a signal path between the two communication terminals. The messages exchanged between the transcoders may include a first message that contains information about the encoding format currently used by a particular communication terminal and further information about the encoding capabilities of the particular communication terminal or transcoder. After the first messages have been exchanged, second messages may be exchanged between the transcoders as a response to the first messages. The second messages may be exchanged if both reported codec types match or regardless of such a match.

According to a further aspect, the invention relates to a method of initiating a TFO in a communication network for a speech communication between a first communication terminal and a second communication terminal, wherein at least one of the terminals uses at least one codec type to encode speech signals into an encoded data representation and wherein the communication network includes a first transcoder and a second transcoder. Messages are sent from the first transcoder to the second transcoder and vice versa to determine if both communication terminals have at least one codec type in common and, if this is the case, to establish a data connection between the first communication terminal and the second communication terminal without having the need to insert transcoding functions into a signal path between the first and the second communication terminal. The method comprises the step of exchanging messages between the transcoders that contain information on the encoder type currently used by the communication terminals and further information on encoding capabilities of the respective communication terminal, and the further step exchanging a further message between the transcoders as a response to the first messages e.g. if both reported codec types match or regardless of such a match.

The information on encoding capabilities may include a TFO version number that is used by the receiving transcoder to look up a subset of an active codec set that is in a mandatory manner supported in the specific TFO version. The transcoder may compare this subset with the codec types supported by the associated communication terminal and the best codec type in common may be chosen to enter into TFO.

The present invention may be implemented as software, as a hardware solution, or as a combination thereof. Thus, the invention also relates to a computer program product with program code portions for performing the individual steps of the invention when the computer program product is run on one or more computing units of the communication network. One or more of the computing units may be part of or co-located with a transcoder. The computer program product may be stored on a computer-readable recording medium.

As regards a hardware solution, the invention relates to a device for processing signals in context with the initiation of the bypassing of a pair of transcoding operations performed in series by a first transcoder arranged together with a first communication terminal on a local side of a communication network and by a second transcoder arranged together with a second communication terminal on a distant side of the communication network. The device comprises a component for receiving information about an encoding format currently in use on the distant side and about encoding capabilities of the distant side and further includes a component for transmitting information about an encoding format currently in use on the local side and about encoding capabilities of the local side to enable on one or on both sides a change of the encoding format currently in use prior to initiating the bypassing of the transcoding operations. Additionally, the device may comprise a component for generation the information about the encoding format currently in use on the local side and about the encoding capabilities of the local side The device may be included in a transcoder or in any other unit of the communication network. If the device is included in a transcoder, the transcoder may further comprise a component for evaluating local and distant encoding information and for controlling the change of the encoding format. Thus, the bypassing protocol may completely or partially be handled by the transcoder.

The invention further relates to a communication system including the transcoder described above and a separate controller for evaluating local and distant encoding information and for controlling the change of the encoding format. For example, the controller may be part of a base transceiver station (BTS) or a base station controller (BSC).

BRIEF DESCRIPTION OF THE DRAWINGS

A more complete understanding of the method and device of the present invention may be obtained by reference to the following detailed description when taken in conjunction with the accompanying drawings, wherein:

FIG. 6a is a table illustrating the content of a TFO version extension block;

FIG. 6b is a table illustrating the content of a codec attribute head extension block;

FIG. 10 is a table illustrating an exemplary TFO version handling mechanism.

DESCRIPTION OF THE PREFERRED EMBODIMENT

In the following description, for purposes of explanation and not limitation, specific details are set forth, such as particular embodiments, signal formats, etc. in order to provide a thorough understanding of the present invention. It will be apparent to one skilled in the art that the present invention may be practiced in other embodiments that depart from these specific details. In particular, while the following embodiment is described herein below in context with an exemplary TFO configuration between a GSM network and a 3G network, the present invention is not limited to such an implementation. It can be utilized in any transcoding environment that allows to bypass two or more transcoding operations that are performed in series. Moreover, those skilled in the art will appreciate that the functions explained herein below may be implemented using individual hardware circuitry, using software functioning in conjunction with a programmed microprocessor or general purpose computer, using an application specific integrated circuit (ASIC), and/or using one or more digital signal processors (DSPs).

In the following, the invention will be described in context with the technical specification 3G TS 28.062 V.5.0.0 that has already been mentioned above. The technical content of this specification as regards TFO is herewith incorporated by reference.

Figure 1:
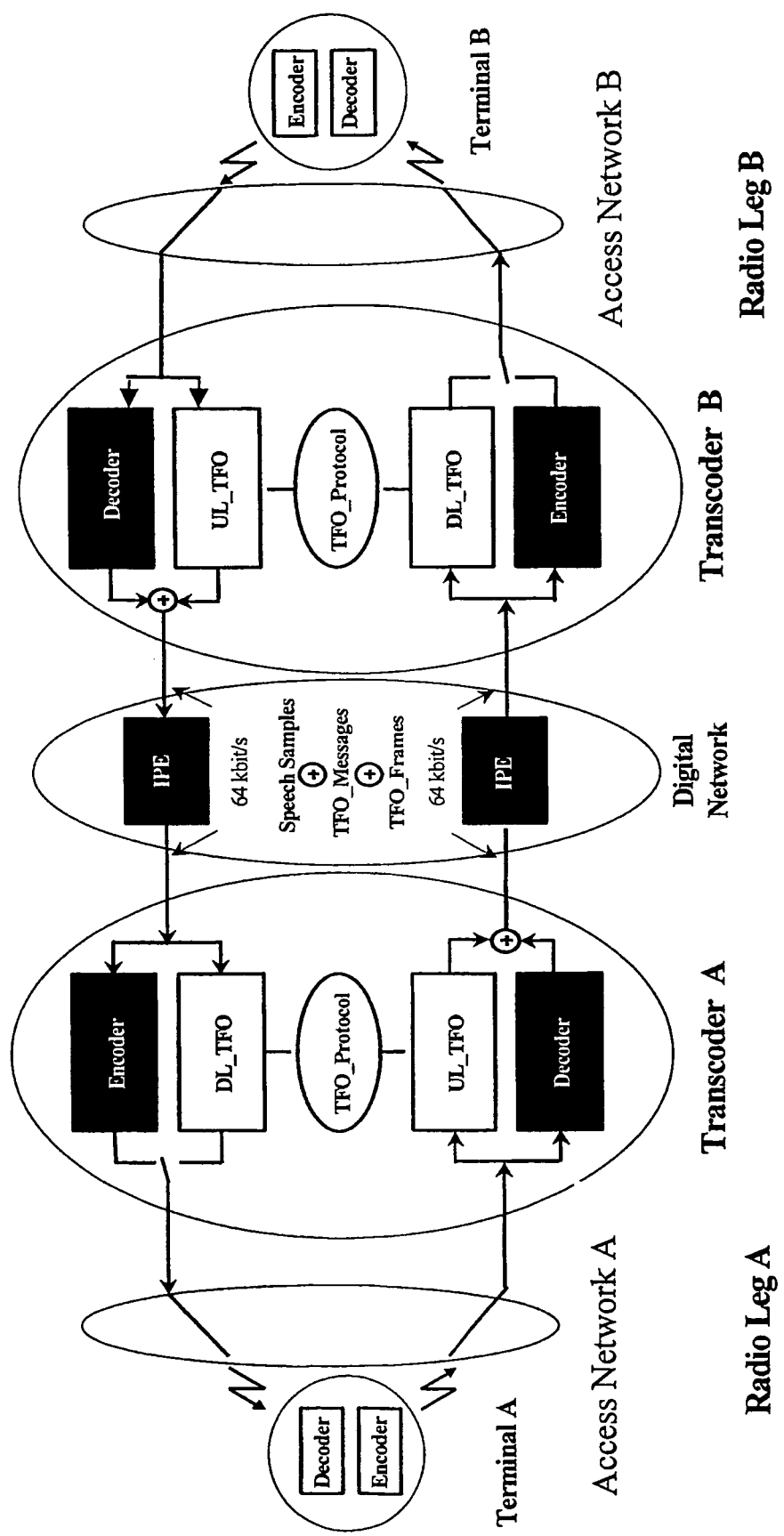
FIG. 1 is a schemetical diagram of the functional entities handling TFO.

FIG. 1 gives a schematical overview over the functional entities of a communication system that are involved when TFO is to be established. The communication system is shown in simplified form and is illustrative of a call routing mechanism between two wireless subscriber units terminal A and terminal B. The subscriber units depicted in FIG. 1 may be mobile terminals or fixed site terminals. In the example depicted in FIG. 1 the terminals A and B are exchanging speech signals. Each terminal A and B is attached via a respective access network A and B to a transcoder A and B, Respectively. The two transcoders A and B communicate via a digital network that includes additional in path equipment (IPE).

Each of the two terminals A and B and each of the two transcoders A and B comprises a decoder and an encoder. In the configuration shown in FIG. 1, the individual speech encoder/decoder pairs (speech codecs) are in tandem operation. However, the transcoders A and B are each equipped with a control logic CTFO_Protocol) that allows to enter a TFO mode. In such an operational mode the individual transcoders A and B are still present in the signal path between the terminals A and B, but their respective transcoding functions are bypassed. As becomes apparent from FIG. 1, the TFO protocol is fully handled and terminated in the transcoders A and B.

Before TFO is activated, the transcoders A and B exchange conventional PCM speech samples at 64 kbit/s that are transmitted via the digital network. Once TFO is activated, the transcoders A and B exchange TFO frames carrying compressed speech and in-band signaling.

In principle, the communication scenario depicted in FIG. 1 applies regardless of the specific call configuration, i.e. regardless of the type of access network involved. In the following the TFO configuration between a GSM network and a 3G network will exemplarily be described in more detail with reference to FIG. 2. The underlying principles can, however, readily be applied to TFO configurations involving the same or two different GSM networks or TFO configurations involving the same or two different 3G networks.

Figure 2:
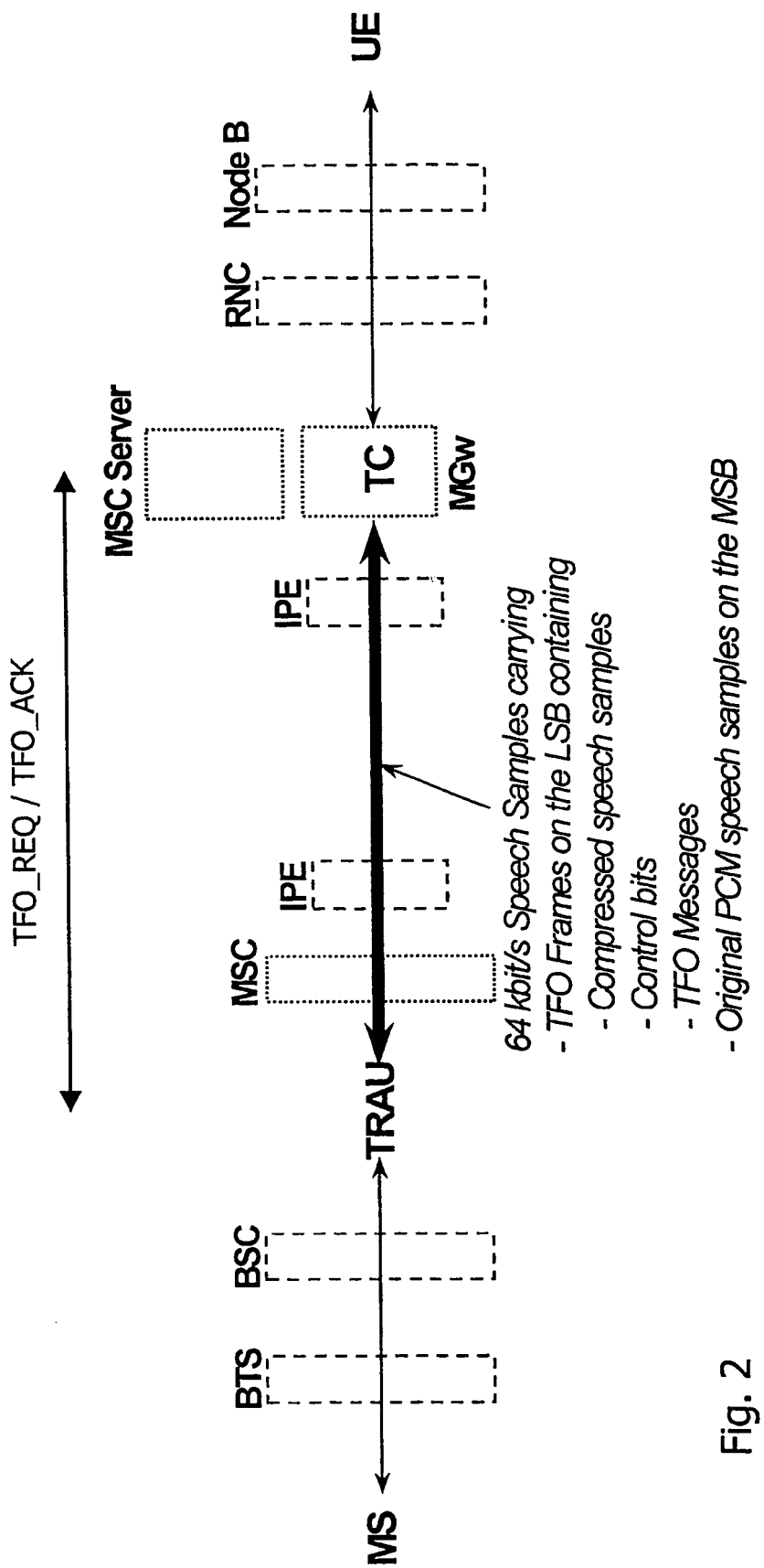
FIG. 2 illustrates an exemplary TFO configuration between a GSM network and a 3G network.

The communication scenario depicted in FIG. 2 includes on the GSM side a mobile station (MS), a base transceiver station (BTS), a base station controller (BSC), a transcoder and rate adaptor unit (TRAU) and a mobile switching center (MSC). On the 3G side a user equipment (UE), a node B, a radio network control (RNC) and a media gateway (MGW) with a transcoder (TC) and an MSC server are arranged. The GSM network and the 3G network communicate via a digital network including IPE.

Each of the TRAU and the TC comprise an interface for receiving information about an encoding format (codec type) currently in use on the respective distant side and about encoding capabilities (TFO protocol version and/or a list of selected alternatively supported codec types) of the respective distant side and for generating and transmitting information about an encoding format currently in use on the respective local side and about encoding capabilities of the respective local side. A software routine running on an internal processor of each of the TRAU and the TC allows the evaluation of the local and distant encoding information and a control of the locally used encoding format.

As has been mentioned before, the TFO protocol is fully handled on the GSM side by the TRAU and on the 3G side by the TC. In the following it is assumed that the GSM network is arranged on the local side and the 3G network on the distant side.

As soon as the local TRAU receives and sends PCM speech samples, it initiates the TFO negotiation and pre-synchronizes IPES. The IPEs will then let TFO messages pass transparently. The distant TC may initiate the same procedure at the same time.

At the beginning of the TFO negotiation the local TRAU sends a so-called TFO_REQ message, indicating its system identification (GSM) and the speech codec type currently used between the MS and the TRAU. If the distant TC supports TFO, it will answer by a so-called TFO_ACK message. The distant TC may send TFO_REQ messages to the local TRAU and receive an TFO_ACK message from the local TRAU at the same time. Should the distant TC not answer with a TFO_ACK message, e.g. because the distant TC does not support TFO or because TFO is disabled there, the local TRAU aborts the TFO protocol after having sent several TFO_REQ messages and returns to its normal mode. It continues, however, to monitor if there are any TFO messages inserted in the PCM samples received from the distant TC.

As has become apparent from the above, the TFO_REQ message identifies the source of the message as a TFO capable device. TFO_REQ, as seen from the sender, contains the following parameters:
  the system identification of the sender,
  the specific local signature of the sender,
  the codec type locally used at the sender side,
  possibly additional attributes for the codec type locally used at the sender side,
  possibly additionally the TFO protocol version supported at the sender side,
  possibly additionally alternative codec types (e.g. a short form of the Co-dec_List as defined in TS 28.062 V.5.0.0),
  possibly additionally a future TFO extension.

The TFO_ACK message, which is the response to the TFO_REQ message, contains the corresponding parameters as TFO_REQ for the opposite side. The only exception is the local signature that is replaced in the TFO_ACK message by the reflected signature as copied from the received TFO_REQ message.

If during the TFO negotiation on the basis of TFO_REQ and TFO_ACK messages a codec mismatch between the local side and the distant side is determined, as well as for sporadic updates of information, TFO_REQL and TFO_ACK_L messages may be exchanged.

TFO_REQL messages contain the following parameters:
  system identification of the sender,
  the specific local signature of the sender,
  the codec type locally used at the sender side,
  a local codec list of alternative codec types, possibly additional attributes for the used and the alternative codec types
possibly additionally the TFO protocol version,
possibly additionally a future TFO extension.

A TFO_ACK_L message is the response to a TFO_REQL message. The TFO_ACK_L message contains the corresponding parameters as the TFO_REQL message for the opposite side, except for the local signature which is replaced by the reflected signature as copied from the received TFO_REQL message.

Figure 3:
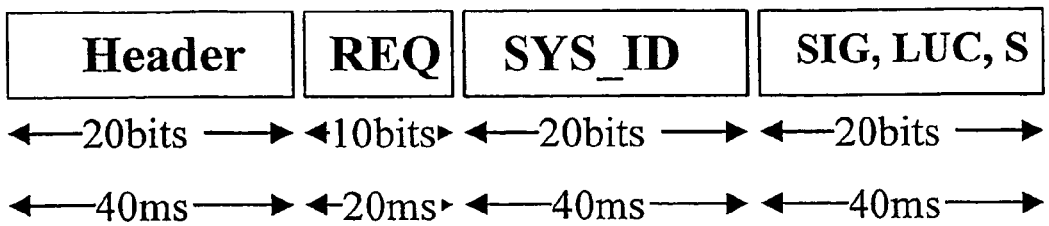
FIG. 3 is a schematical diagram of the shortest possible TFO_REQ message.
Figure 4:
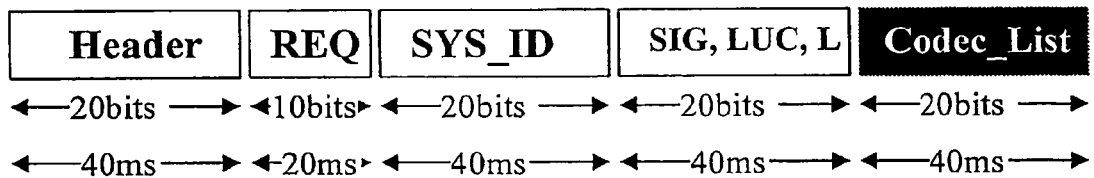
FIG. 4 is a schematical diagram of the shortest possible TFO_REQL message.

FIGS. 3 and 4 show the configuration of the shortest possible TFO REQ message and of the shortest possible TFO_REQ_L message. The shortest TFO_REQ message takes 140 msec for transmission, whereas the shortest TFO_REQL message takes 180 msec.

The structure of the TFO messages depicted in FIGS. 3 and 4 follows the generic in-band signaling (IS) message principle. More specifically, the messages depicted in FIGS. 3 and 4 include a header block consisting of a 20 bit long sequence that is followed by a command block of 10 bits identifying the TFO message as a TFO request. The third block is in each case a system identification block having a length of 20 bits and specifying the type of network from which the request originates (3G GSM, . . . ).

The fourth block of the TFO_REQ message depicted in FIG. 3 includes the local signature (SIG) of the sender, the locally used codec type and an indicator S which indicates that no further blocks are following (S=short). The fourth block of the shortest possible TFO_REQ L message depicted in FIG. 4 is similar to the fourth block of the TFO_REQ message but includes an indicator L (long) which points at a codec list that is included in a fifth block.

In order to enable a TFO negotiation that allows establishment of a TFO (i.e. bypassing of the transcoding operations that are performed by the local TRAU and the distant TC in FIG. 2) on the basis of an optimal codec configuration on both sides, one or more additional blocks including encoding information may be appended to the shortest possible TFO_REQ message depicted in FIG. 3. Such an extended TFO_REQ message is shown in FIG. 5.

Figure 5:
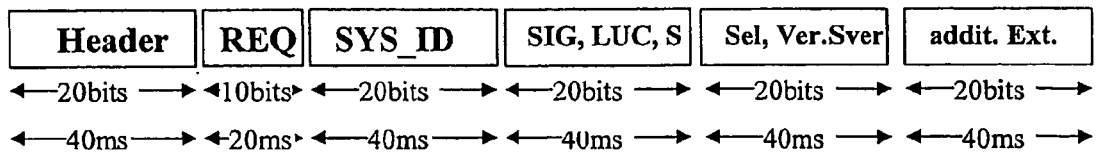
FIG. 5 is a schematical diagram of a TFO_REQ message including detailed encoding information.

The extended TFO_REQ message of FIG. 5 includes a fifth block called TFO version extension block that contains information about the encoding capabilities of the respective transcoder and additionally a selector. The information about the encoding capabilities relates to the TFO protocol version and subversion (Ver.Sver) supported by the respective transcoder. The selector (Sel) indicates if and which additional extension blocks are following. The exemplary TFO_REQ message shown in FIG. 5 includes one additional extension block (sixth block).

It should be noted that blocks similar to the fifth and sixth block of the TFO_REQ message depicted in FIG. 5 may be appended to the TFO_ACK message. Moreover, a block similar to the fifth block (TFO version extension block) of the TFO_REQ message of FIG. 5 may be appended to the TFO_REQL or the TFO_ACK_L message. In the following, the additional blocks of the TFO_REQ message of FIG. 5 will exemplarily be described in more detail.

The TFO version extension block (fifth block in FIG. 5) contains the TFO version (4 bit) and TFO subversion (4 bit) that are supported by the respective transcoder. The supported TFO version and TFO subversion are indicative of the various codec types available to a particular transcoder, i.e. indicative of the particular transcoder's encoding capabilities.

The TFO version extension block further includes the selector which is used to indicate the number and content of additional extension blocks following the TFO version extension block (if any). The selector code "00000" indicates that no further extension block is following. If the selector code is set to "00001" this indicates that a particular transcoder supports alternative codec types, which are specified in one or more further extension blocks following the TFO version extension block. The selector is preferably only used in TFO_REQ or TFO_ACK messages (i.e. not used in TFO_REQL or TFO_ACK L messages) to provide information on alternative codec types at an early stage of TFO protocol, i.e. before TFO is established.

For each alternative codec type that is offered during TFO negotiation, one codec attribute head extension block can be included in the TFO_REQ message. If the specified codec type requires additional attributes, then the required number of codec attribute extension blocks follow after the codec attribute head extension block. The one or more extension blocks following the TFO version extension block thus include information about the encoding capabilities on a particular network side in the form of a list of one or more (alternatively) supported codec types. A list of alternative codec types is terminated when the two EX bits at the end of a particular extension block indicate no further extension blocks ("00") and the next TFO message header is following.

The exemplary content of the TFO version extension block is depicted in the table of FIG. 6a and the exemplary content of the codec attribute head extension block, which identifies the codec type and the number of additional extension blocks that will follow, can be gathered from the table of FIG. 6b. The codec attribute head extension block may proceed the codec attribute extension blocks of a codec type if this codec type needs additional attributes.

The TFO version extension block and any additional extension blocks indicated by the selector may be the last extension blocks of a TFO_REQ, a TFO_REQ_L, a TFO_ACK or a TFO_ACK_L message. This is advantageous in order to provide compatibility with older protocol versions, which should be able to skip these extension blocks without being effected negatively. Thus, a high degree of compatibility between different protocol versions can be achieved. Usually, only messages generated on the basis of protocol versions higher than a particular version will (and actually should) include TFO version extension blocks. If no TFO version extension blocks are detected in a TFO_REQ or similar message, a protocol version lower than a specific version can be assumed by the receiving side.

In the following, an exemplary immediate codec type optimization scenario during establishment of a TFO mode for the network configuration depicted in FIG. 2 will be described with reference to FIGS. 7 to 9. The term "immediate optimization" relates to the fact that it will be decided about a change of the codec types currently in use not only in the case of non-compatible codec types (codec mismatch), but also if compatible encoding formats are currently used on both sides. Thus, the immediate decision can advantageously be performed at a very early stage of the call set-up without the necessity of a prior evaluation of the question whether or not the currently used codec types are actually compatible.

Figure 7:
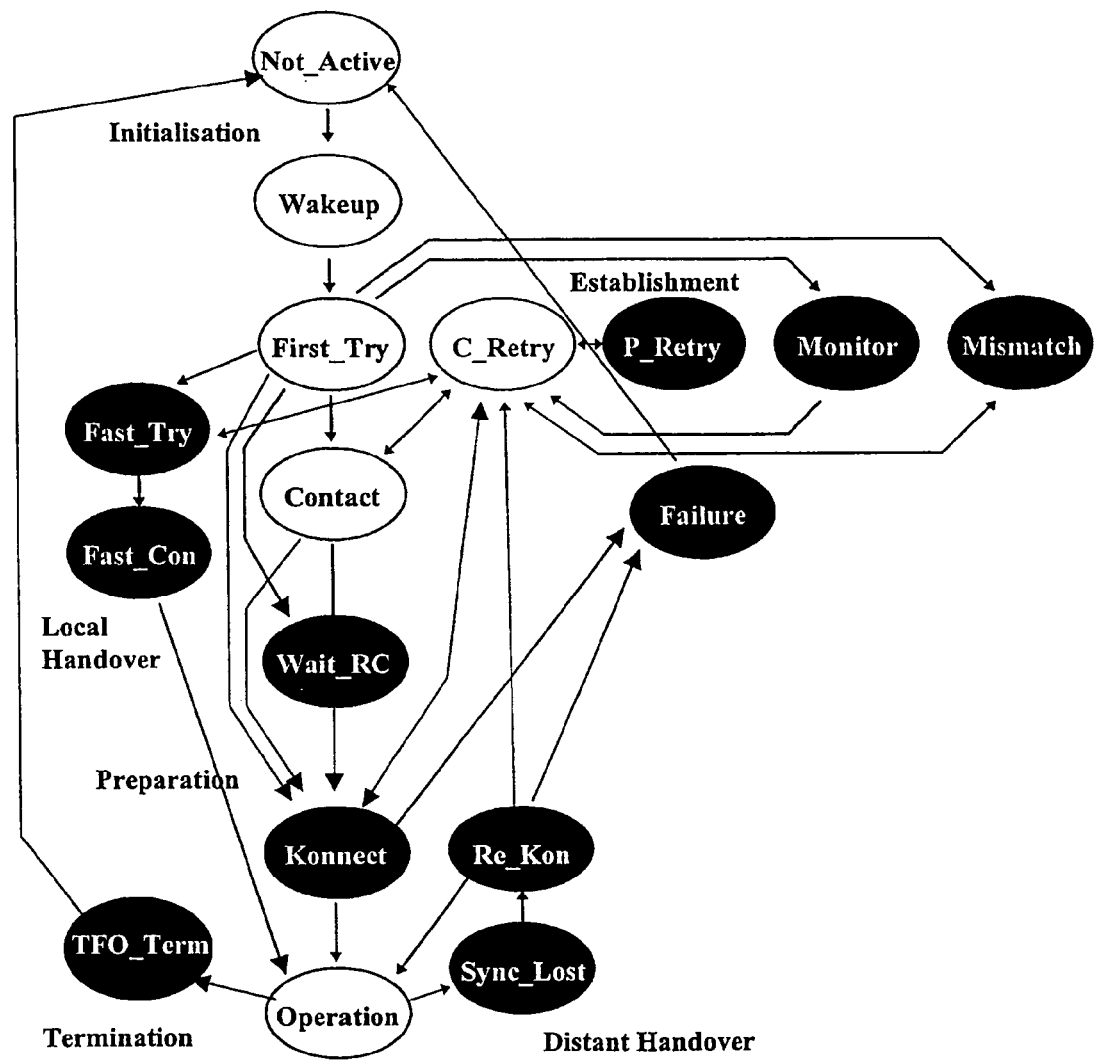
FIG. 7 is a schematical diagram of a TFO protocol state machine with the most important transitions.

FIG. 7 shows a schematic diagram of a state machine, consisting of 17 states that describe the TFO protocol process. The five main states are initialization, establishment, contact, preparation and operation. These states will now be described in more detail for the exemplary protocol flow depicted in FIGS. 8 and 9.

Here it is assumed that both sides start with narrowband AMR (AMR-NB), but indicate that wideband AMR (AMR-WB) is supported also. Usually, such a situation will lead to an immediate TFO setup on the basis of AMR-NB. In the present immediate codec type optimization scenario, however, no immediate TFO setup in AMR-NB is performed because both sides can use better codec types and configurations.

Figure 8:
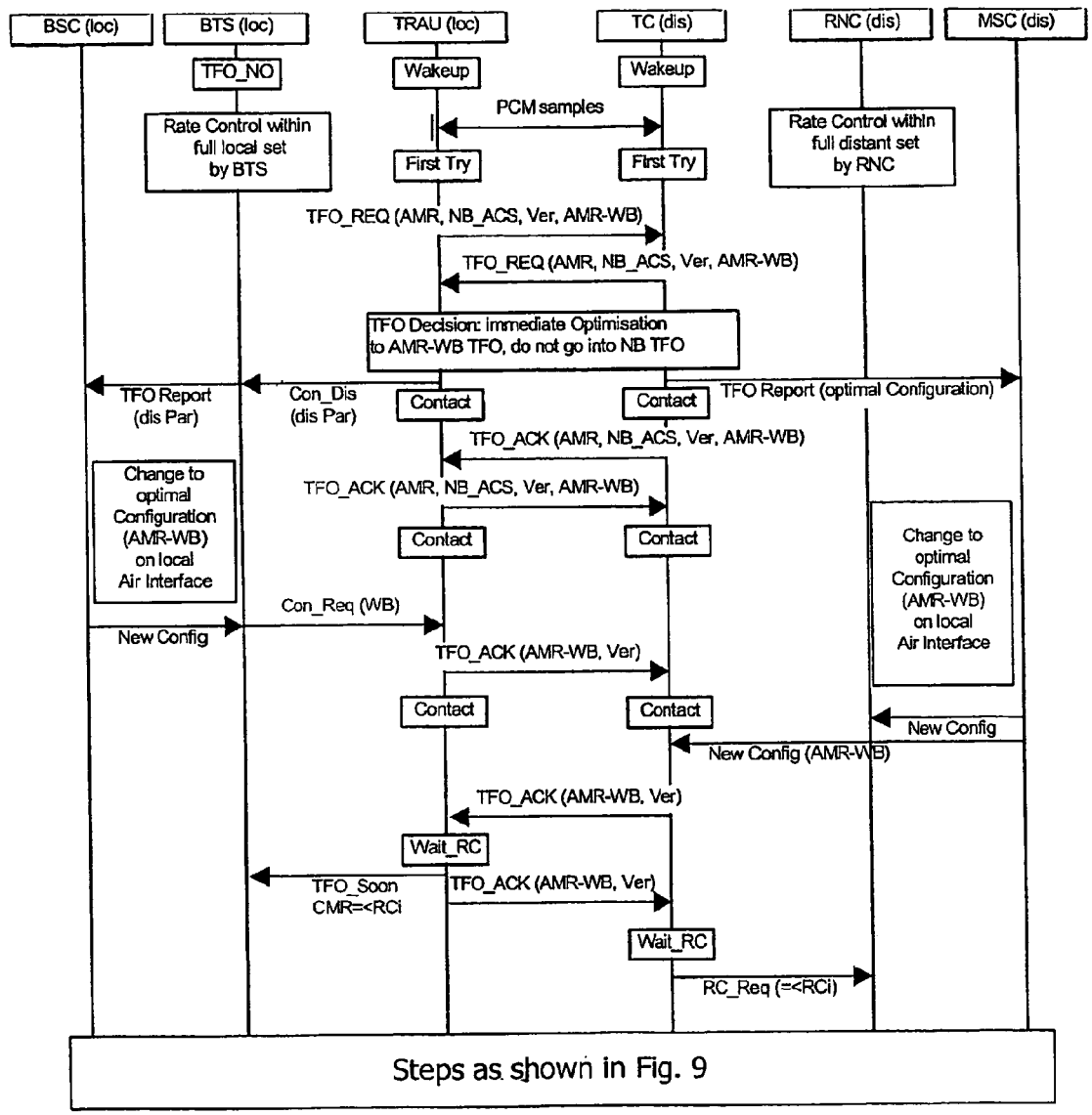
FIG. 8 is an exemplary flow chart depicting the process of immediate codec type optimization according to the invention.
Figure 9:
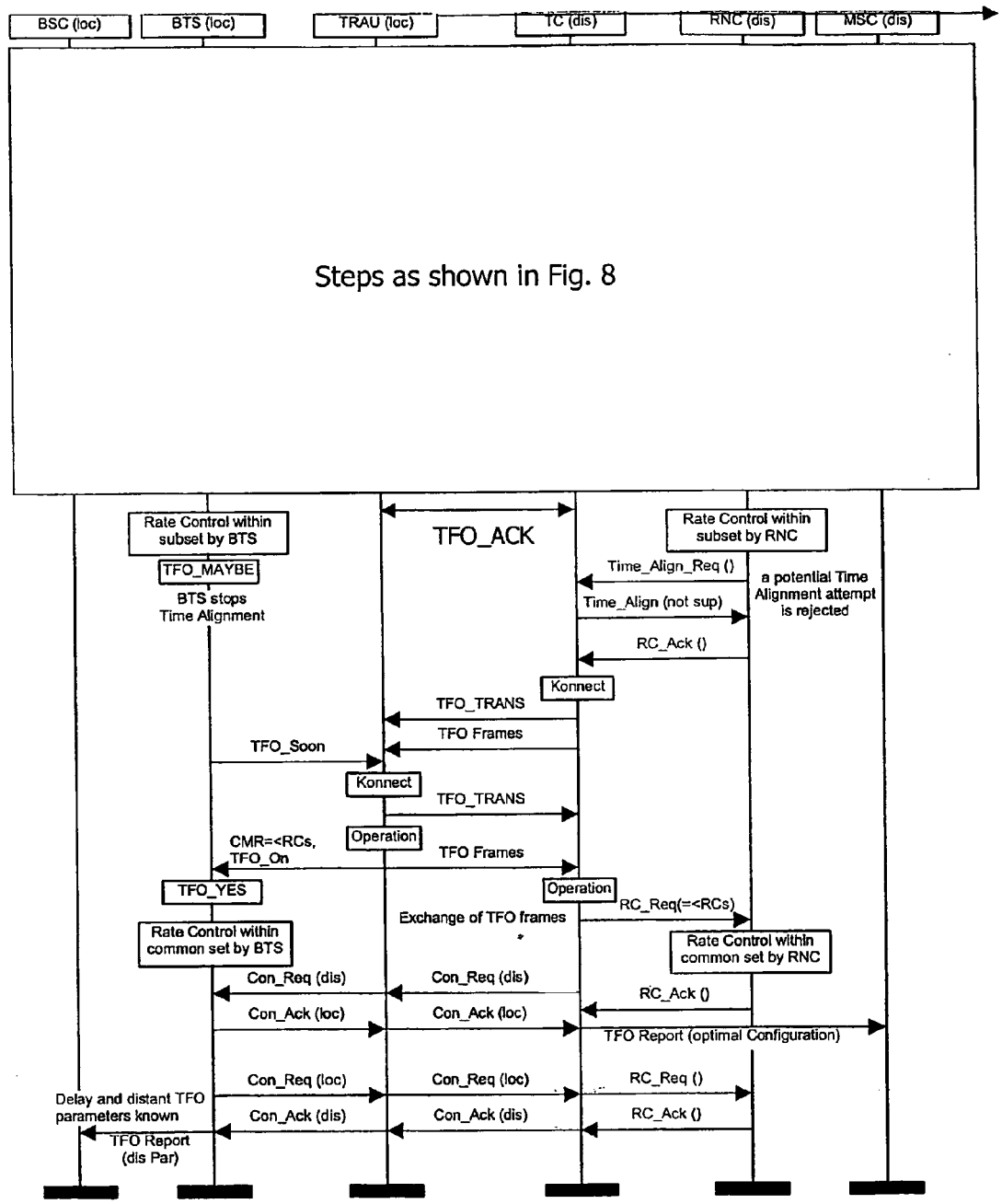
FIG. 9 is a flow chart depicting TFO establishment after the immediate codec type optimization of FIG. 8.

The initial state of the TFO protocol is the Not_Active state (see FIGS. 7 and 8). In this state the TFO protocol is not active and the TRAU/TC work in a conventional way. The Not_Active state is left and a transition to a Wakeup state is performed when a new speech call is set up and/or when TFO gets enabled. In the Wakeup state the TFO protocol waits until PCM speech samples are received. Then a transition to the First Try state is performed and TFO_REQ messages similar to those depicted in FIG. 5 are exchanged between the local TRAU and the distant TC for a certain period of time.

As becomes apparent from FIG. 8, each TFO_REQ message includes an indication that the sending side currently operates on AMR-NB codecs (AMR, NB-ACS). ACS stands for active codec set, which in the case of AMR further specifies this encoding format. Each TFO_REQ message additionally includes encoding information about the encoding capabilities of sending side (Ver, AMR-WB). This encoding information comprises the version Ver of the supported TFO protocol as well as an indication of an alternatively supported encoding format (here: AMR-WB).

After the TFO_REQ messages have been exchanged both the TRAU and the TC can utilize the obtained information on the encoding capabilities of the respective distant side locally to look up a subset of an ACS that is supported on the respective distant side. This subset is compared with the codec types supported on the respective local side so that the best codec type in common can be chosen for initiating TFO.

As soon as the TRAU and the TC have received and evaluated the TFO_REQ message from the opposite side a Contact state can be entered because in the present case the codecs match and the ACSs are compatible. In cases where the codecs do not match and/or the ACS are not compatible a Mismatch state (if supported) is entered. During a codec mismatch resolution routine the TRAU and TC will then exchange their full codec capabilities (supported codec list, with the full range of parameters for these codecs) by sending TFO_REQL messages or so-called Con_Req frames. These are acknowledged by TFO_ACK_L messages or so-called Con_Ack frames, respectively.

In the Contact state TFO_ACK messages need to be sent to check the transparency of the link to the opposite side. After the exchange of TFO_REQ and/or TFO_ACK messages it will be obvious that a preferred TFO configuration (AMR-WB) is possible if the codec type at the local and at the distant side are changed. In this situation the TFO protocol stays in the Contact state and performs an immediate codec type optimization, i.e. initiates a change of the encoding formats currently used by the local and the distant side.

In general, an immediate codec type optimization routine is initiated each time both sides indicate a specific TFO version (e.g. both sides indicate a TFO version greater than or equal to 5.3, see FIG. 10) and, at the same time, the available information on alternative codec types indicates that a change of the local and/or distant codec type results in a TFO configuration with a higher preference level. Whenever new information about alternative codec types becomes available, the conditions for immediate codec type optimization set forth above are re-evaluated. A possible TFO decision scheme for codec type optimization is described in 3GPP TS 28.062 V.5.0.0, herewith incorporated by reference. Although this decision scheme relates to codec type optimization at a later stage of the TFO protocol, it can also be applied in mechanisms for immediate codec type optimization.

In the present case the TFO decision mechanism will indicate that in the scenario depicted in FIG. 8 a change of the codec type to AMR-WB on both sides is preferable, i.e. will result in an optimal TFO configuration. Both the local TRAU and the distant TC report the optimal AMR-WB configuration to initiate a change to AMR-WB on the respective air interfaces. As soon as each side has switched to AMR-WB, the opposite side is notified thereof with an appropriate TFO_ACK message reporting the currently used encoding format (AMR-WB) and (again) the respective TFO protocol version.

As soon as the TFO_ACK indicating that the encoding format of the opposite side has been changed to AMR-WB has been received, the TRAU and the TC know that the optimal TFO configuration has been achieved and immediate codec type optimization is complete. Since an AMR-WB codec type has been selected, the TRAU and the TC send rate control commands downlink to their BTS/RNC in order to steer the uplink codec mode down to the TFO setup mode for a save TFO setup. Additionally, a further TFO_ACK message is sent to the opposite side and the TFO protocol transits into the Wait_RC state as depicted in FIGS. 7 and 8. This Wait_RC state exists only when the locally used codec type is an AMR or AMR-WB codec. For all other codec types this state is not entered and all transitions go directly into the Konnect state, thus skipping the Wait_RC state (see FIG. 7).

In the Wait_RC state the TFO protocol waits for the acknowledgment from the BTS/RNC that the rate control command has been received and executed. Then the TC sends a so-called TFO_TRANS message to bypass the IPEs, starts sending TFO frames and the TFO protocol transits into a Konnect state.

In the Konnect state the TFO frames and possibly embedded TFO messages are sent as long as correct TFO messages are received. The first received TFO frame causes the transition from the Konnect state into the Operation state.

In the operation state, the main state of the TFO protocol, TFO frames are sent and received. Thus, the TFO connection is fully operating. As becomes apparent from FIG. 9, a further codec type optimization commands Con_Req and Con_Ack may be sent in the operation state when TFO is established.

As has been explained above, the objective of immediate codec type optimization is to switch the codec type on the local and/or the distant side (if this results in a preferred TFO configuration) while the TFO protocol is in the Contact state, i.e. at a very early state of the TFO protocol. The required information to decide if immediate codec type optimization shall be performed is comprised in the TFO REQ and TFO_ACK messages including the TFO version extension block and (optionally or mandatory) additional extension blocks specifying selected alternatively supported encoding formats. If a preferred TFO configuration becomes possible by changing the local and/or distant codec type, both sides remain in the Contact state as long as immediate codec type optimization is performed, i.e. until the local and/or the distant side has/have changed the codec type. After the switching, TFO protocol continues as usual.

Immediate codec type optimization using information about encoding capabilities in the form of TFO protocol versions allows an effective TFO version handling. Preferably, immediate codec type optimization becomes effective only in TFO protocol version 5 or higher. If either the local or the distant side is using a lower TFO protocol version, no immediate codec type optimization is used. Hence, the protocol is compatible with older versions that do not include immediate codec type optimization. A switch to a different codec type will nonetheless be possible using the ordinary codec type optimization routines that have been defined for the Mismatch or Operation state described above.

The exchange of the TFO protocol version has further advantages. For example, the usage of specific features and/or encoding formats may be associated to specific versions of the TFO protocol. Hence, when receiving a TFO_REQ/ TFO_ACK message with a specific version number, the receiving side knows which features and/or encoding formats may be used.

In the present scenario the smallest defined TFO protocol version number is 0.0. It stands for all TFO protocol versions before 5.3. All numbers between 0.0 and 5.3 may be reserved for future use. If the local and the distant version number differ, the smaller version number shall have precedence and shall be applied on both sides. The table of FIG. 10 gives an overview over an exemplary TFO version handling mechanism.

For example, the knowledge of the protocol version number may be used to decide on the encoding format to transport the so called "TFO configuration parameters". After a successful TFO negotiation, when the protocol is in the Operation state, either old or new (so called "generic") configuration frames can be used because both sides know the TFO version of the opposite side and can flexibly decide how to handle any subsequent changes of the encoding format. A possible scenario for the handling of configuration frames is depicted in the right hand column of the table that is shown in FIG. 10.

For example, the following constellations can be handled:
a) V4.x<->V4.x: use old Configuration frames or the TFO_REQL and TFO_ACK_L protocol.
b) V4.x<->V5.x: use old Configuration frames or the TFO_REQL and TFO_ACK_L protocol.
c) V5.x<->V5.x: use new Configuration frames or the TFO_REQL and TFO_ACK_L protocol.

Furthermore, the exchange of the protocol version number also allows more sophisticated decisions in the TFO decision block of FIG. 8. For example, a decision "No TFO at all" may result from the fact that the TFO version numbers or other configuration parameters reveal that the current call scenario is not favorable for TFO. In TFO protocol version 4.x.y TFO configuration parameters are exchanged as so called "old configuration frames" in a very specific and somehow scattered form within the speech and no-speech frames. Accordingly, the implementation needs some effort. With the early exchange of the TFO protocol version number it is now possible that a version 5 transcoder rejects the TFO attempt of a version 4 transcoder and thus has a potential for cost saving.

As has become apparent from the above, the exchange of information about the encoding capabilities leads to a faster TFO setup as regards an optimal encoding format like AMR-WB. Furthermore, the extension blocks used for signaling the encoding capabilities guarantee that the TFO messages are better prepared for further extensions. The TFO version negotiation described above allows to flexibly decide in an early stage of the TFO protocol whether TFO setup is desirable or not.

Although embodiments of the method and device of the present invention have been illustrated in the accompanying drawings and described in the foregoing detailed description, it will be understood that the invention is not limited to the embodiments disclosed, but is capable of numerous rearrangements, modifications and substitutions without departing from the spirit of the invention as set forth and defined by the following claims.

The invention claimed is:

1. A method of initiating the bypassing of a pair of transcoding operations performed in series by a first transcoder arranged together with a first communication terminal on a local side of a communication network and by a second transcoder arranged together with a second communication terminal on a distant side of the communication network, said method comprising the steps of:
receiving by the first transcoder arranged with the first communication terminal on a local side of a communication network from the second transcoder arranged with the second communication terminal on the distant side, in a first initial request to bypass transcoding operations, information about an encoding format currently in use by the second communication terminal on the distant side and about encoding capabilities of the second communication terminal, including the version of the bypassing protocol supported by the second transcoder; and,
transmitting by the first transcoder arranged with the first communication terminal to the second transcoder arranged with the second communication terminal on the distant side, in a second initial request to bypass transcoding operations, information about an encoding format currently in use by the first communication terminal on the local side and about encoding capabilities of the first communication terminal, the information about the encoding capabilities including the version of a bypassing protocol supported by the first transcoder, to enable on one or on both sides a change of an encoding format currently in use prior to initiating the bypassing of the transcoding operations.

2. The method of claim 1, further comprising the step of deciding about the change of the encoding format even if compatible encoding formats are currently used on both sides.

3. The method of claim 1, wherein the information on the encoding capabilities of the second communication terminal on the distant side is used to determine an alternative encoding format that is supported on both the first communication terminal on the local and the second communication terminal on the distant side.

4. The method of claim 3, wherein the change of the encoding format is effected on the basis of the alternative encoding format.

5. The method of claim 1, wherein the information about the encoding capabilities includes data embodied on a computer readable medium about encoding formats supported by the respective communication terminal.

6. The method of claim 1, wherein the change of the encoding format is effected with the purpose of establishing an optimal encoding configuration on the basis of compatible encoding formats between the communication terminals on both sides.

7. The method of claim 1, further comprising the steps of changing the encoding format currently in use and notifying the second transcoder arranged with the second communication terminal on the distant side thereof prior to entering an operational state bypassing the transcoding operations.

8. The method of claim 4, wherein a bypassing protocol is aborted if incompatible protocol versions are used by the first and second communication terminal on the two sides and/or, in the case of compatible protocol versions, the encoding format is changed in a contact state of the bypassing protocol that is followed by an operational state in which the transcoding operations are bypassed.

9. The method of claim 1, wherein the information about the encoding format used by a terminal includes a codec type that is used to encode speech signals into an encoded data representation.

10. The method of claim 1, wherein the information on the encoding capabilities of the second terminal on the distant side is used to look up a subset of encoding formats supported by the second terminal on the distant side, wherein that subset is compared with the encoding formats supported by the first terminal on the local side and wherein the best encoding format in common is chosen to initiate bypassing of the transcoding operations.

11. The method of claim 1, wherein the information about the encoding format currently in use and about the encoding capabilities are included in a message embodied in a computer readable medium requesting the initiation of a bypassing protocol or a message acknowledging such a request.

12. The method of claim 11, wherein the information about the encoding capabilities is appended in the form of one or more individual information blocks to the message.

13. The method of claim 12, wherein a first appended block includes the version of a bypassing protocol and an indicator that indicates if the first appended block is followed by a second appended block that includes a list of supported encoding formats.

14. The method of claim 1, wherein the method is performed in context with setting up of a tandem free operation (TFO) between the two communication terminals.

15. The method of claim 1, wherein at least one of the communication terminals uses at least one encoding format in the form of a codec type to encode speech signals into an encoded data representation and wherein messages are sent between the two transcoders to determine if the communication terminals have at least one codec type in common and if this is the case to establish a data connection between communication terminals without having the need to insert transcoding functions into a signal path between the communication terminals.

16. The method of claim 14, wherein between the transcoders first messages are exchanged that contain the information about the encoding format currently used by the respective communication terminal and that contain the further information about the encoding capabilities of the respective communication terminal or transcoder.

17. The method of claim 14, wherein a second message embodied on a computer readable medium is exchanged between the transcoders as a response to the first message if both reported codec types match or regardless of such a match.

18. A computer program product comprising program code portions for performing the steps of claim 1 when the computer program product is embodied on a computer readable medium and loaded into and executed by one or more processors within computing units of the communication network.

19. A device for processing signals in context with the initiation of the bypassing of a pair of transcoding operations performed in series by a first transcoder arranged together with a first communication terminal on a local side of a communication network and by a second transcoder arranged together with a second communication terminal on a distant side of the communication network, said device comprising:
 a component for receiving information, in a first initial request to bypass transcoding operations, about an encoding format currently in use by the second communication terminal on the distant side and about encoding capabilities of the second communication terminal, including the version of the bypassing protocol supported by the second transcoder; and,
 a component for transmitting information, in a second initial request to bypass transcoding operations, about an encoding format currently in use by the first terminal on the local side and about encoding capabilities of the first terminal, the information about the encoding capabilities of the first terminal including the version of a bypassing protocol supported by the first transcoder, to enable on one or on both sides a change of an encoding format currently in use prior to initiating the bypassing of the transcoding operations.

20. A transcoder including the device of claim 19.

21. The transcoder of claim 20, further comprising a component comprised therein for evaluating local and distant encoding information and for controlling the change of the encoding format.

22. A communications system including the transcoder of claim 20 and a controller for evaluating local and distant encoding information and for controlling the change of the encoding format.

23. The communications system of claim 22, wherein the controller is included in a BTS or a BSC.

* * * * *

UNITED STATES PATENT AND TRADEMARK OFFICE
CERTIFICATE OF CORRECTION

| | | |
|---|---|---|
| PATENT NO. | : 7,933,258 B2 | Page 1 of 1 |
| APPLICATION NO. | : 10/512103 | |
| DATED | : April 26, 2011 | |
| INVENTOR(S) | : Farber et al. | |

It is certified that error appears in the above-identified patent and that said Letters Patent is hereby corrected as shown below:

In Column 6, Line 16, delete "side" and insert -- side. --, therefor.

In Column 6, Lines 16-22, delete "The device may be......by the transcoder." and insert the same at Line 17, as a new paragraph.

In Column 6, Line 36, delete "schemetical" and insert -- schematical --, therefor.

In Column 6, Line 43, delete "TFO_REQL" and insert -- TFO_REQ_L --, therefor at each occurrence throughout the patent.

In Column 7, Line 30, delete "Respectively." and insert -- respectively. --, therefor.

In Column 7, Line 38, delete "CTFO_Protocol)" and insert -- (TFO_Protocol) --, therefor.

In Column 8, Line 20, delete "IPES." and insert -- IPEs. --, therefor.

In Column 9, Line 2, delete "types" and insert -- types, --, therefor.

Signed and Sealed this
Sixth Day of September, 2011

David J. Kappos
*Director of the United States Patent and Trademark Office*